United States Patent [19]
Collins et al.

[11] Patent Number: 5,437,553
[45] Date of Patent: Aug. 1, 1995

[54] METHOD AND APPARATUS FOR AUTOMATED LEARNING AND PERFORMANCE EVALUATION

[76] Inventors: Deborah L. Collins, P.O. Box 667, Woodland Park, Colo. 80866; Anne S. Blocker, 1422 Harbor View, Galveston, Tex. 77550

[21] Appl. No.: 682,428

[22] Filed: Apr. 8, 1991

[51] Int. Cl.6 .............................................. G09B 5/00
[52] U.S. Cl. .................................. 434/322; 434/323; 434/335
[58] Field of Search ............... 434/322, 323, 327, 335, 434/336, 350–353, 362

[56] References Cited
U.S. PATENT DOCUMENTS

| | | | |
|---|---|---|---|
| 4,829,431 | 5/1989 | Ott et al. ............................ | 343/323 |
| 4,877,408 | 10/1989 | Hartsfield ....................... | 343/323 X |
| 5,002,491 | 3/1991 | Abrahamson et al. ............ | 434/322 |
| 5,035,625 | 7/1991 | Munson et al. ................... | 434/362 |
| 5,059,127 | 10/1991 | Lewis et al. ..................... | 434/362 X |
| 5,180,309 | 1/1993 | Egnor ............................. | 434/327 X |

*Primary Examiner*—Richard J. Apley
*Assistant Examiner*—Glenn E. Richman
*Attorney, Agent, or Firm*—Baker & Botts

[57] ABSTRACT

A method and apparatus is provided for automated learning and performance evaluation of a group of items by a user. The apparatus, which can be a digital computer, has input means for receiving a user's response, a display means for presenting the material to be learned and logic means for sorting the items. The method, which can be practiced on a digital computer, has steps of querying the user as to whether items are believed to be known or unknown, sorting the items into groups of perceived known and unknown items and generating a sequence of items to be displayed. An important feature of this invention is that the user is tested regarding his belief as to whether the item is known or unknown not as to his actual knowledge.

17 Claims, 7 Drawing Sheets

METHOD AND APPARATUS FOR AUTOMATED LEARNING AND PERFORMANCE EVALUATION

TECHNICAL FIELD OF THE INVENTION

This invention relates generally to an educational training teaching tool and more specifically to a method and apparatus for automated learning and performance evaluation.

BACKGROUND OF THE INVENTION

There are many factors that contribute to the way people learn. These factors include the way in which the information or material is presented (i.e., the teacher), the way in which the individual processes and recalls information, genetic predispositions toward information processing, multiple forms of intelligence, the repetition rate at which the information is presented, individual attention span, the base of information already known by the individual, and perhaps most important of all, the individual's learning style and receptivity toward learning and learned material, this includes the role of emotion in learning and performance.

With this in mind then, the design of automated learning systems is difficult at best. When these systems are to be applied to the general public having diverse backgrounds and cultural differences the problem becomes monumental. This problem is not just associated with "classroom" situations but with electronic games, military and corporate training, remedial education, coaching and a myriad of other teaching, selling, public education, learning and therapeutic situations.

Accordingly, a need exists in the art for an automatic teaching system and learning method which adjusts for learning speed, learning style, cultural differences and previously learned material and which allows a student to be receptive over extended periods of time to the material to be learned.

A need also exists in the art for taking any material to be learned and presenting that material to a student or user in an order and manner tailored to the learning receptivity of that student or user and in a pattern easily assimilated by that student.

A further need exists for a performance method which provides a specific quantitative measurement of the student's confidence level and self-esteem for specific learned material independent of that student's knowledge of the material.

SUMMARY OF THE INVENTION

In one embodiment of the invention an apparatus is provided for teaching a group of items to a user or evaluating performance of the user. The apparatus comprises means for displaying each of the items to the user. The apparatus further comprises means for receiving a response from the user and logic means, responsive to the user's response, for sorting the items into two groups of known and unknown subjective items. The apparatus further comprises means for generating a sequence of subjective items, including at least one each of the known and unknown subjective items, and supplying the sequence to the display means.

A technical advantage of the apparatus of the present invention is that a group of items can be learned faster and more completely with better retention. Another technical advantage is that boredom is used advantageously in the learning process. Another technical advantage is that the receptivity of the user is improved by employing high repetition rates for newly learned facts. It is still a further technical advantage of the invention that there is provided an apparatus which creates a pattern of known and unknown material and which adjusts the pattern to suit the individual user. It is still a further technical advantage of the invention to provide an apparatus for individualized instruction from a single set of material, customized for each individual student or user that can be taught in a way best enabling a student to learn the material.

In another embodiment of the invention a method is provided evaluating performance of a user or for teaching to a user a group of items where each of the items is paired to a specific response. The method includes the following steps performed in this or a different order: One, the user is queried as to whether each item in the group is known or unknown. Two, the group of items are sorted into a first group of known subjective items and a second group of unknown subjective items. Three, a sequence of the subjective items is generated including at least one each of the known and unknown subjective items. Four, the sequence of subjective items is displayed in the following manner: If the item is an unknown subjective item, then the item and its paired response are displayed together, if the item is a known subjective item then the item is displayed at a first time and the paired response is displayed at a later time.

One technical advantage of the invention is that a method is provided for teaching to a user a group of items where each of the items is paired to a specific response. Another technical advantage of the method of the present invention is that the items and their paired responses are sorted into groups of known and unknown material based on a user's subjective response. Still another technical advantage of the method in accordance with the present invention is that the material is displayed to the user in such a way that unknown items are presented with their paired response at the same time while known items are displayed first while the paired response is displayed at a later time.

BRIEF DESCRIPTION OF THE DRAWINGS

For a more complete understanding of the present invention and the advantages thereof, reference is now made to the following description taken in conjunction with the accompanying drawings, in which.

DETAILED DESCRIPTION OF THE INVENTION

Using repetition for instructional purposes is well-known in the prior art. Such methods are used for learning associated terms like vocabulary words, a foreign language, names and numbers. Each of the items to be learned has an associated paired response. In the prior art, the material may be presented either in print or electronically as a set of flash cards or visual display screens with a question and answer (a fact and a definition) all in the form of a selected item and paired response.

In one prior art method using a set of flash cards, the flash cards are separated into separate groups or sets of flash card chunks to be learned. The information is learned one chunk at a time by simply studying the cards and performing self-tests. Cards that are tested correctly are set aside while cards that are tested incorrectly are repeated until learned. When one group or chunk is learned, another group is studied until that group is learned. The process continues until all cards in all groups are learned.

In another prior art method, the items to be learned are separated by a test into groups of known and unknown items. The user then focuses on studying and repetitive learning, including the self-testing process, of the unknown items. As an unknown item is learned, it is transferred to the known items until all unknown items are learned.

Figure 1:
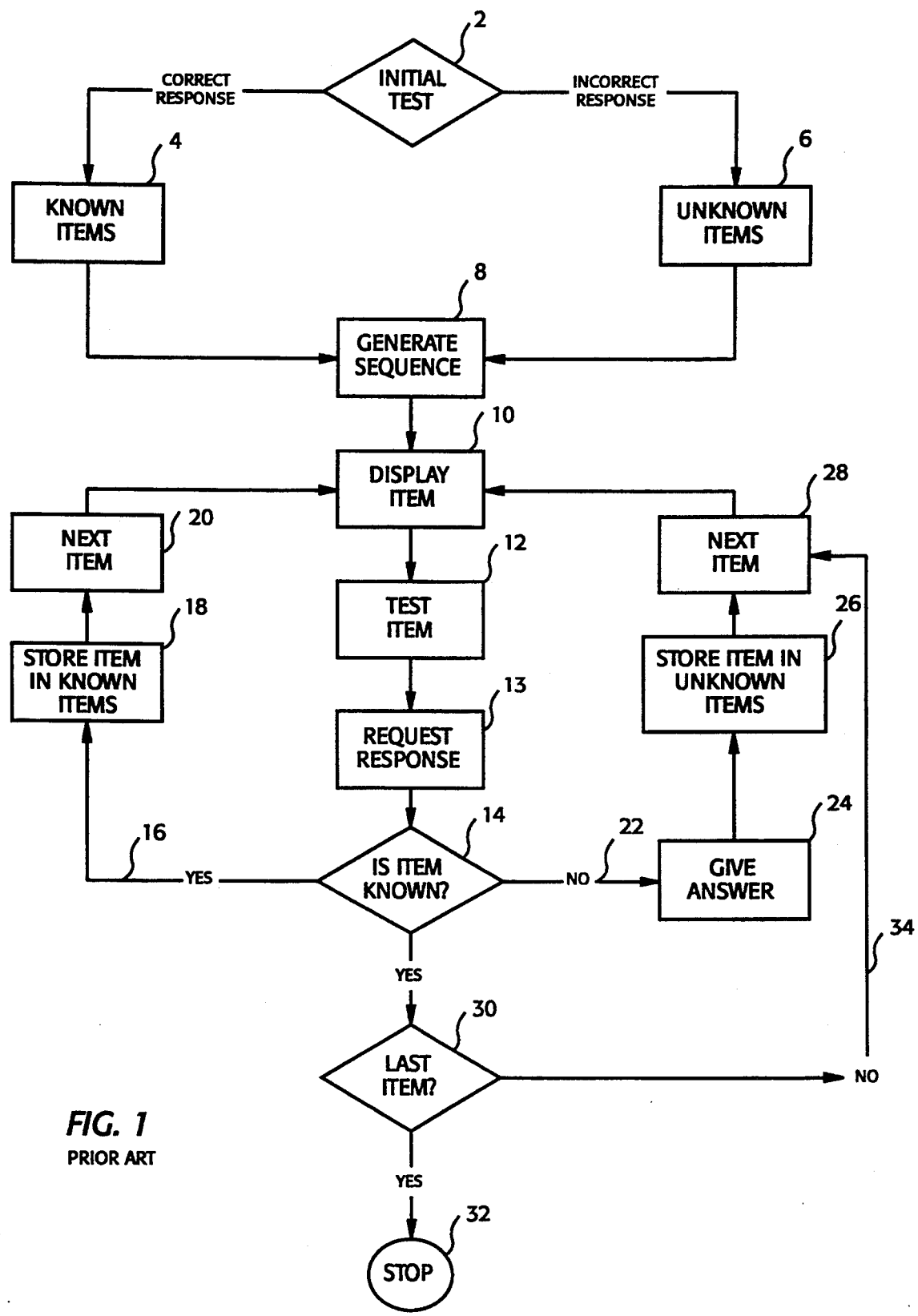
FIG. 1 illustrates a block diagram of a prior art system using repetition for instructional purposes.

In another prior art method shown in FIG. 1, a group of items to be learned is separated by an initial test 2 into two groups of known items 4 and unknown items 6 based on the user's actual knowledge, not his perceived knowledge. Once the items have been separated into the two groups, a sequence of known and unknown items is generated at a sequence generator 8. Each of the items in the sequence is then presented on a display 10 and then tested 12.

The user is then presented with the test item and required to give a response at step 13. The response is evaluated at decision point 14. If the answer is correct, then the method follows along the path 16 and the item is then stored 18 in the collection of known items 4 and the next item in the sequence is incremented at step 20 and the process continues.

If the response evaluated at decision point 14 is incorrect, then the method follows along path 22 to step 24 where the user is provided the answer or paired response to the item. The process continues and at step 26 the item is stored in the collection of unknown items 6. At step 28 the sequence is incremented and the next item in the sequence is displayed. Returning to decision point 14, if the item is known, the method determines at step 30 whether the item is the last item to be learned; if it is, the process stops at step 32, if not, and there are items remaining, the process continues along path 34 and the next item in the sequence is incremented and the process continues.

Figure 2:
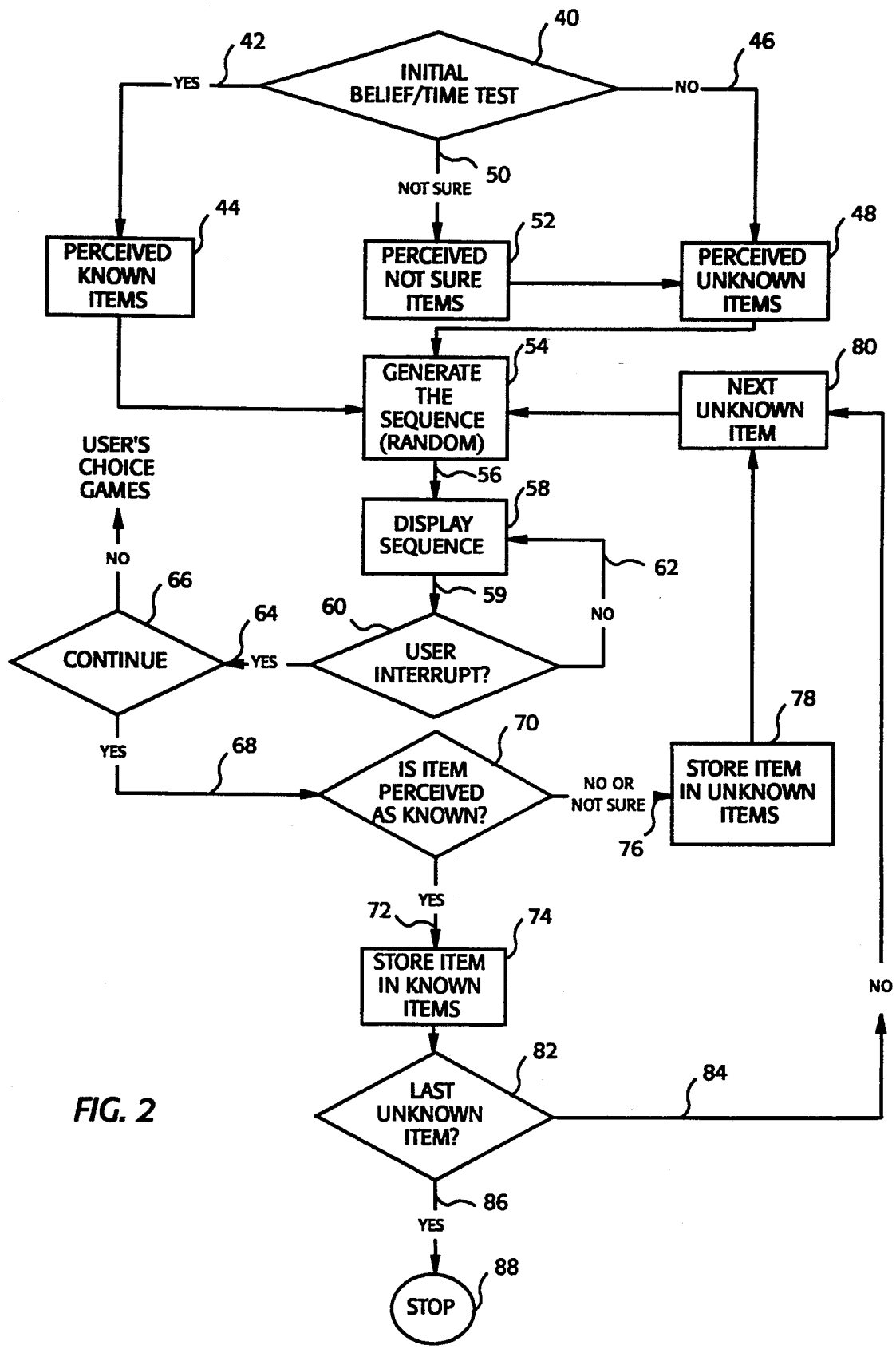
FIG. 2 illustrates a block diagram of one embodiment of a method in accord with the present invention.

In one embodiment of the present invention shown in FIG. 2, a method is provided that separates the items to be learned or for use in measuring performance into three groups based entirely on the user's perception of whether he knows the item not on the basis of whether the item is actually known or unknown. It should also be understood that the terms "known" and "unknown" represent a relative multilevel degree of knowledge and not an absolute binary knowledge. It should also be understood that any perceptible factor can be substituted for the known and unknown items described in the preferred embodiments. For example, this invention can be used to test for use or nonuse. A further refinement of the sorting process sets a time limit for receiving the user's subjective response. In this method, beginning with step 40, the user is provided with an item and given an initial test as to whether he believes he knows the answer or not. Also, there is a clock running, unseen and unknown by the user, that times the response. It should be emphasized that in this test, the user is asked whether or not he knows the item, not tested on the item. If the user states that the answer is known, then the process follows path 42 and the item is stored in the perceived known items category 44. If the user responds that the item is not known, the process follows path 46 and the item is stored in the perceived unknown items category 48. If the user responds that he is not sure whether the item is known or unknown, then the process follows path 50 and the item is stored in the perceived not sure items category 52. It is also noted that if the user fails to give a response within the predetermined time period, then the item is treated as an unknown item and stored in perceived unknown items category 48. The perceived not sure items in category 52 are combined with the perceived unknown items in category 48 and are called subjectively unknown items. The subjective unknown items together with the perceived subjective known items are directed to sequence generator 54 which creates a sequence or list of unknown and known subjective items.

In the preferred embodiment, the sequence will include at least one unknown item and a plurality of randomly selected known items. The subjective unknown items can be thought of as arranged in order from 1 to N where N is the total number of subjective unknown items. The sequence generator 54 selects the first subjective unknown item and combines that with the randomly selected subjective known items to generate the sequence. Once the sequence is generated, the process follows along path 56 and the first item in the sequence is then displayed to the user by display 58. The method will continue displaying each item in the sequence until such time as a user interrupt occurs. The item can be displayed visually or auditorily in a variety of ways including animation, color adaptation, repetition, position, dimensional, sound and rhythm. In this way there is a continued repetitious presentation of the subjective unknown item along with randomly selected subjective known items.

Now following along path 59 to user interrupt 60, the method determines whether the user has chosen to interrupt the presentation. If not, the process follows path 62 and returns to display 58 where the next item in the sequence is presented. If there is a user interrupt detected at user interrupt 60, the process follows path 64 to decision block 66 where the method determines whether the user should continue with the current sequence or divert to other activities. If the method continues with the current sequence, the process follows path 68 to decision block 70. At decision block 70, the user is queried about the item and is asked whether the item is perceived as known or unknown. Again, this is a subjective test only. If the item is perceived known, the method follows path 72 and the item is stored at step 74 in perceived known items 44. After the item is stored at step 74, the method checks at decision block 82 to see whether the unknown item is the last unknown item. If the item is not the last unknown item, the method follows path 84 to next unknown item selector 80 which selects the next unknown item and passes control to sequence generator 54 for generating new sequence. Returning to decision point 82, if the unknown item was the last unknown item, then the process follows path 86 and stops at point 88.

Returning to decision point 70, if the item is perceived as unknown, or the user is not sure whether the item is known or unknown, the process follows path 76 and the item is stored at step 78 in perceived unknown items 48. After the item is stored, the next unknown item is selected at next unknown item selector 80 and a new sequence is generated by sequence generator 54.

Figure 3:
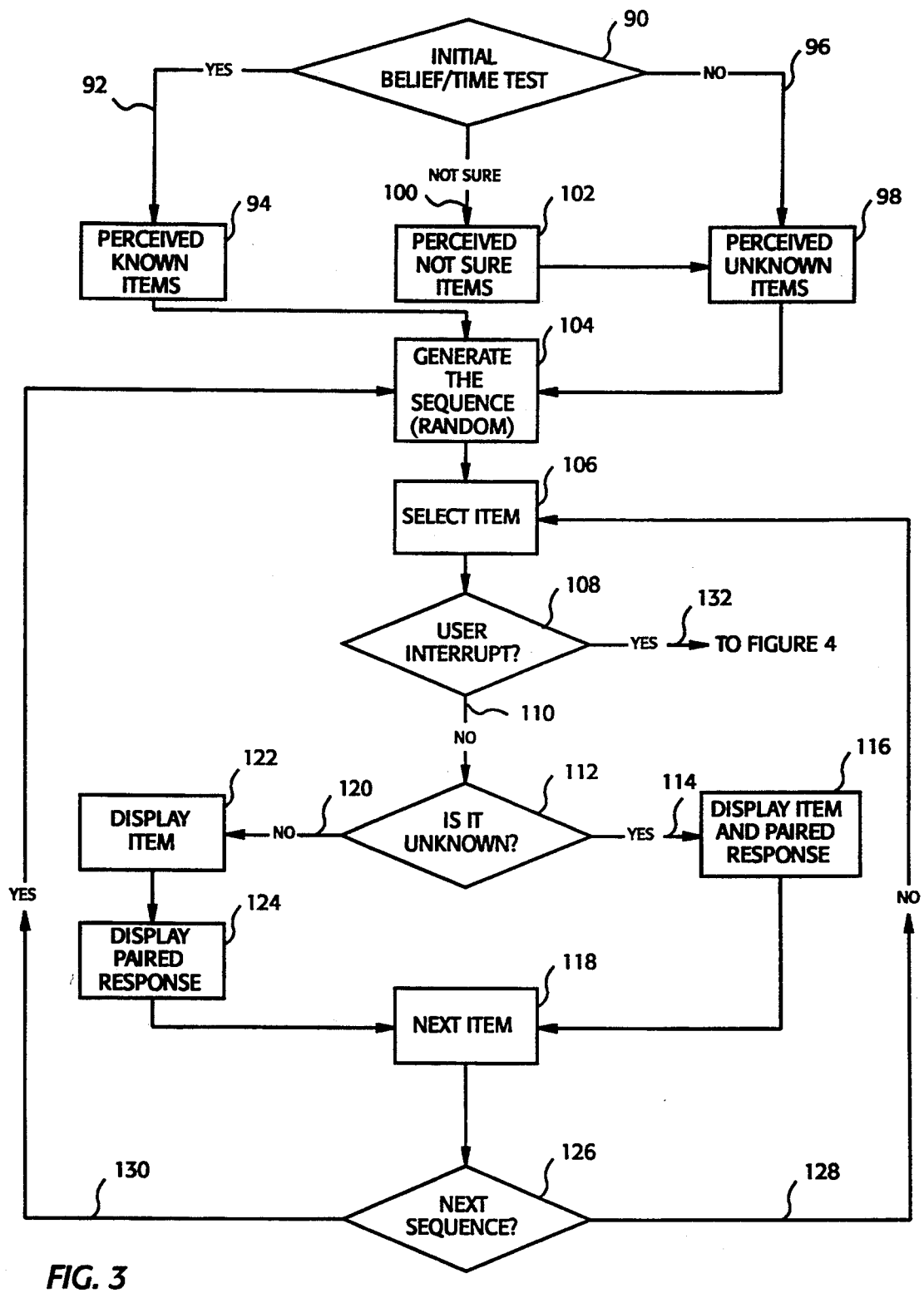
FIG. 3 illustrates a block diagram of a second embodiment of a method in accord with the present invention.

Referring now to FIG. 3, an alternative embodiment of the method in accord with the present invention is shown. In this method, each of the items in a group of items to be learned has an associated paired response. In initial step 90, the user is queried as to whether he believes he knows the item and its paired response. The user is not asked to give or provide the paired response at this time. Also the response is timed and if a response is not given within a predetermined time T, then the item and its paired response are treated as a perceived unknown item. If the user responds that he knows the item and its paired response, the process follows path 92 and the item with its associated paired response is stored in an array 94 labeled perceived known items. If the user fails to respond within time T or responds that the item is not known, then the process follows path 96 and the item is stored in array 98 as a perceived unknown item. If the user responds that he is not sure whether the item is known or unknown, the process follows path 100 and the item is stored in array 102 as a perceived not sure item. The items in arrays 98 and 102 are combined in a single table of unknown items.

When all the items in a group of items to be learned have been sorted into the various arrays, the process continues to the step of generating a sequence of subjective items. Sequence generator 104 produces a sequence or list of perceived known items and perceived unknown items. In the preferred embodiment the sequence generally consists of a single perceived unknown item and a plurality of randomly selected perceived known items. Once the sequence has been generated by sequence generator 104, the first subjective item in the sequence is selected at item selector 106.

At anytime after the item is selected, the user is permitted to interrupt as shown at step 108. If there is no user interrupt, the process follows path 110 to determine whether the selected subjective item is a perceived known or perceived unknown item at step 112. If the item is a perceived unknown item, then the process follows path 114 and both the item and its paired response are displayed to the user simultaneously at display 116. After the item and its paired response are displayed at step 116, the list of sequenced items is incremented and the next item is incremented at step 118. If the item selected at step 106 is a perceived known item, then the process follows path 120. The perceived known item is displayed at display item step 122 at a first time. Then at a later time, the associated paired response is displayed to the user at display paired response step 124. After the associated paired response is displayed at step 124, the list of sequenced items is incremented by the next item at step 118. After the sequence has been incremented, the process determines at step 126 as to whether the sequence is completed, if not, then the process follows path 128 and the next item is presented. If the item is the last item in the sequence, then the process follows path 130 and a new sequence of subjective items is generated by sequence generator 104.

Figure 4:
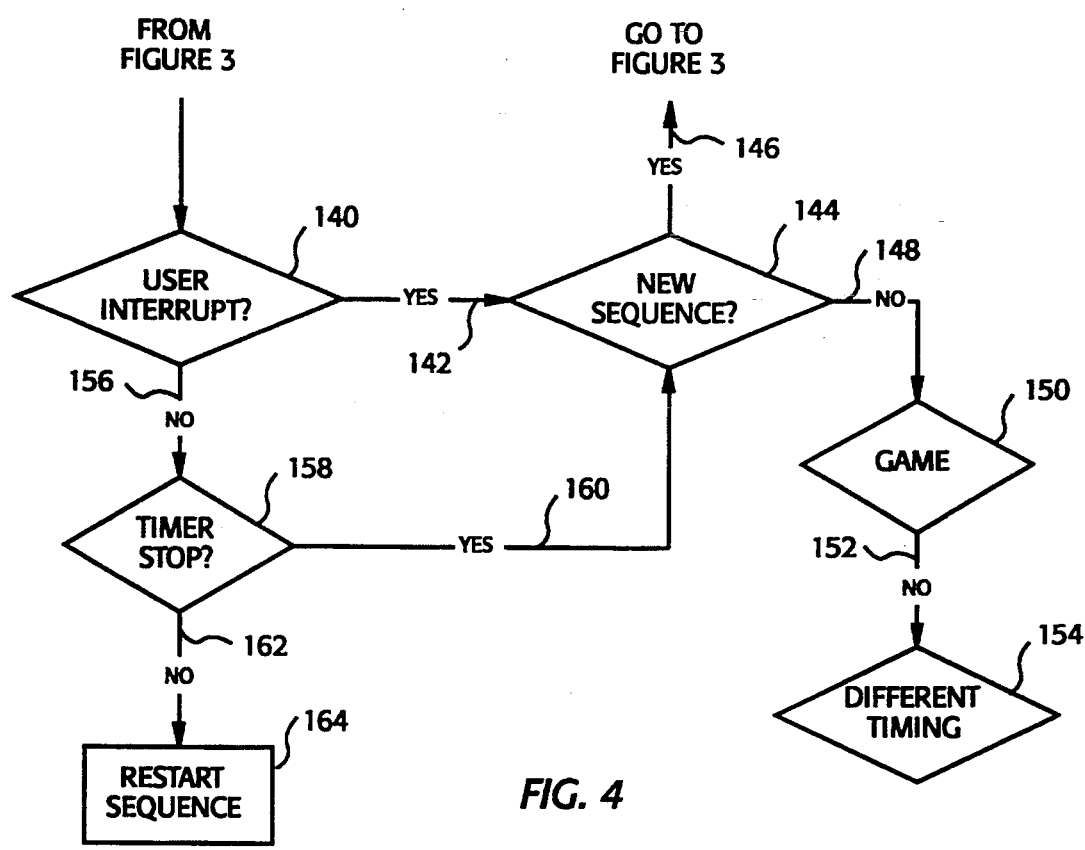
FIG. 4 illustrates a block diagram of an interrupt sequence used in connection with the method of the present invention.

One unique feature of the method of the present invention is the novel way it permits the user to interrupt the learning process at any time. Still referring to FIG. 3, if a user interrupt is detected at step 108, the method branches along path 132 to FIG. 4. Referring now to FIG. 4, the unique interrupt feature of the present invention is described. Decision box 140 is activated at the step in the process of FIG. 3 shown at 108. If the system determines that the user has actually activated the interrupt, the process follows path 142 and the user is queried at decision block 144 as to whether he wishes to begin a new sequence or not. If the user selects to initiate a new sequence, the process branches through path 146 back to sequence generator 104 (FIG. 3). Sequence generator 104 is activated to select a new unknown and generate a new sequence for continuing the method. If the user decides not to select a new sequence and responds NO, the process may follow path 148 and the user is queried at game step 150 as to whether he wishes to divert his attention. If yes, the process branches to a set of games that are specifically designed to help alleviate boredom, improve the user's attention span or teach some other aspect of the paired association such as exact spelling. There can also be games of any conventional sort such as Hangman, etc. If the user decides not to select a game, the process continues down path 152 and the user is at step 154 asked whether he would like a different test or different learning scheme such as the performance evaluation illustrated in FIG. 5. If the user answers YES, the process branches to the new Test. If the user responds NO, then the method stops.

Returning now to user interrupt 140, should it be determined that it was not the user that interrupted the method, the process follows path 156 and determines at timer 158 whether the timer timed out. In one embodiment, the method is provided with a timer to measure the user's response time. It also functions, when used in connection with a stored program digital computer and display, to time out automatically and stop in the event that the user is no longer working with the device. In another embodiment, timer 158 can be a counter used to measure cycling by counting the number of times an unknown has been repeated. If the user is cycling too fast, the method can automatically initiate new sequence 144 or different testing 154. If the user is cycling too slowly, the method can branch to a prescriptive game 150 or other activity. If timer 158 has timed out, then the process follows path 160 and returns to decision point 144 and may ask the user whether he wishes to choose a new sequence. If it is determined that the timer has not stopped, the process follows path 162 and the sequence is restarted at step 164 and the process continues.

Figure 5:
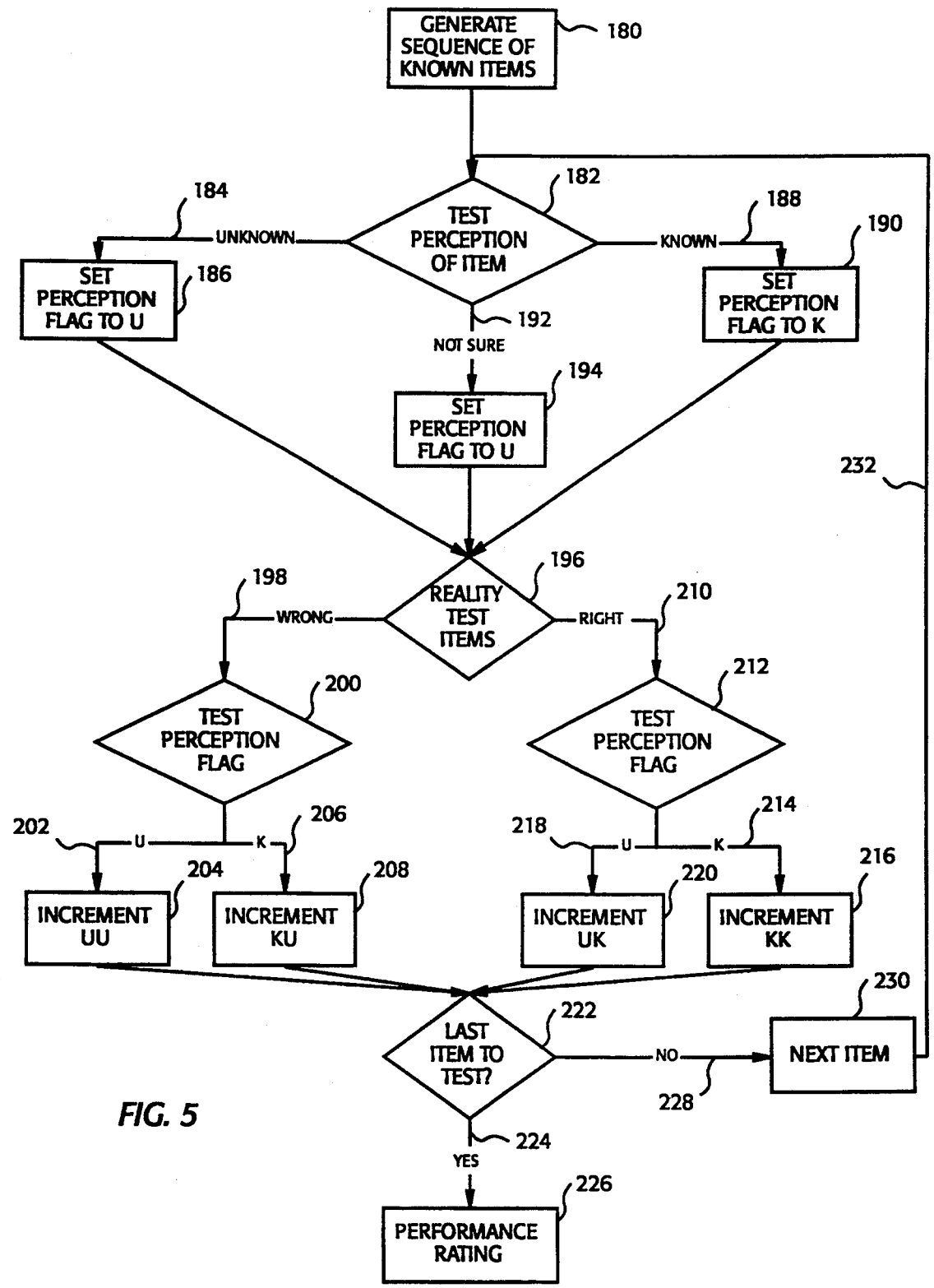
FIG. 5 illustrates a block diagram of a third embodiment of the method in accord with the present invention.

Referring now to FIG. 5, another embodiment of a method in accordance with the present invention is described directly related to evaluating performance. Beginning at step 180, a sequence of items is generated and presented to the user one item at a time at test perception step 182. In step 182, the user is asked whether he knows the item, whether he does not know the item or whether he is not sure if the item is known or unknown. Again, it must be emphasized that what this invention seeks to determine is not whether the item is actually known or unknown, but whether the user believes the item is known or unknown.

If the user responds at step 182 that he does not know the item, the process follows path 184. At step 186, a perception flag is set, in this case a "U" for unknown. If the user responds that he does know the item, the process follows path 188 and the perception flag is set to "K" for known at step 190. If the user responds that he is not sure whether the item is known or unknown, the process follows path 192 and the perception flag is set to "U" for unknown at step 194.

After the perception flag has been set, the item is presented to the user and he is queried as to his actual knowledge of the item. This occurs at reality test step 196 where the user is asked to provide an appropriate response. If the response is incorrect or wrong, the process follows path 198 where the perception flag is tested at step 200. If the flag was set to U, the process follows path 202 and the UU counter is incremented by one at 204. If the perception flag is set to "K", the process follows path 206 and the "KU" counter is incremented by one at step 208.

Returning to test block 196, if the user provides the correct or right response, the process follows path 210 and the perception flag is tested at step 212. If the perception flag had previously been set to "K" for known, the process follows path 214 and the "KK" register is incremented by one at step 216. If the perception flag was set to "U", the process follows path 218 and the "UK" register is incremented by one at step 220. After the appropriate registers have been incremented in steps 204, 208, 216 and 220, the process determines whether the item is the last item in the sequence at counter 222. If it is the last item in the sequence, the process moves along path 224 to performance rating step 226. If the item is not the last item, the process follows path 228 and at step 230 the sequence of items is incremented by one and returned along path 232 to test perception block 182. One method of rating or evaluating performance is to divide the sum of registers 204 and 216 by the sum of registers 204, 208, 216 and 220 expressing the result as a percentage referred to as a current measure of knowledge. Another performance evaluation is calculated by taking one minus the sum of registers 208 and 220 divided by the sum of registers 204, 208, 216 and 220 expressed as a percentage referred to as a measure of performance ability. Other performance rating calculations are well-known to those of ordinary skill in the art.

Figure 6:
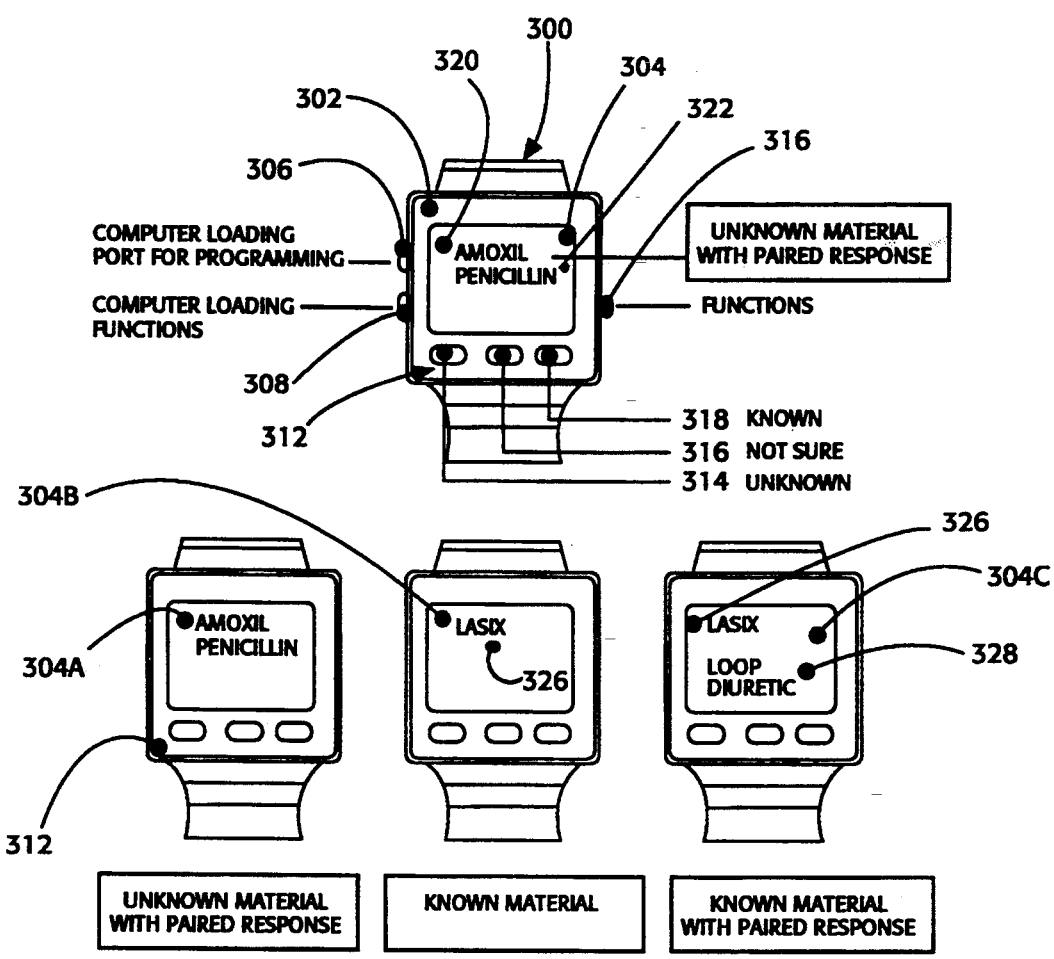
FIG. 6 illustrates a first embodiment of an apparatus of the present invention showing different displays of known and unknown items in accord with the learning method of the present invention.

Referring now to FIG. 6, an apparatus for practicing the invention is shown as a wrist-mounted computer with a visual display. It should also be known that the display can be either an audio annunciator or the combination of a visual and audio display. Referring to FIG. 6, the improved learning apparatus is shown generally at 300 and consists of a housing 302, a display 304, ports 306 and 308 that interface an external general purpose computer with the internal computer or microprocessor (not shown). Function switch 310 is used to control apparatus functions such as ON/OFF. Shown generally at 312 are the input devices which can be standard pressure sensitive switches labeled "Unknown" 314, "Not Sure" 316 and "Known 318.

Not shown in FIG. 6, but well-known to those having ordinary skill in the art, is a conventional computer system or microprocessor possessing standard processing, memory and I/O functions. In the memory would be stored a list or file of data consisting of the items or a group of items to be taught to the user. In this case, shown on display 304 are the two names of a drug, the tradename and its generic name (the item and its paired response). Display means 304 flashes the item 320, in this case the word, "amoxil", and the paired, response 322 beneath it in this case the word, "penicillin".

After the item 320 and its paired response 322 are flashed and presented on display 304, switches 314, 316 and 318 are activated as means for receiving a response from the user. If the user believes that he knows the association between amoxil and penicillin, he depresses "Known"switch 318. If, on the other hand, the user does not know the relationship, he depresses "Unknown" switch 314. If the user is unsure as to whether the relationship is known or unknown, he presses "Not Sure" switch 316. Using standard computer techniques, the input from switches 312 is fed to the logic means of the microprocessor which labels the item as "Known" if switch 318 was activated by the user or "Unknown" if either switches 314 or 316 are activated by the user. The system continues displaying the various items 320 with the associated paired response 322 and querying the user for his perception until the list of items is completed. Once the list or sequence is completed, the microprocessor, through its stored program, generates a new list or sequence of the items to be learned, including at least one each of the known and unknown subjective of items.

Still referring to FIG. 6, there are shown three separate displays 304A, 304B and 304C illustrating how the items 320 and the paired response 322 are presented to the user in a sequence. Beginning with 304A, both the unknown item 320 with its paired response 322 is shown on the display. At anytime after the first unknown is displayed more than once, the user can activate any of switches 312 to interrupt the process. Once unknown item 320 is displayed with its paired response 322, the system presents a known item 326 on display 304B. After a suitable time delay, the paired response 328 to item 326 is displayed together and presented to the user on display 304C.

Figure 7:
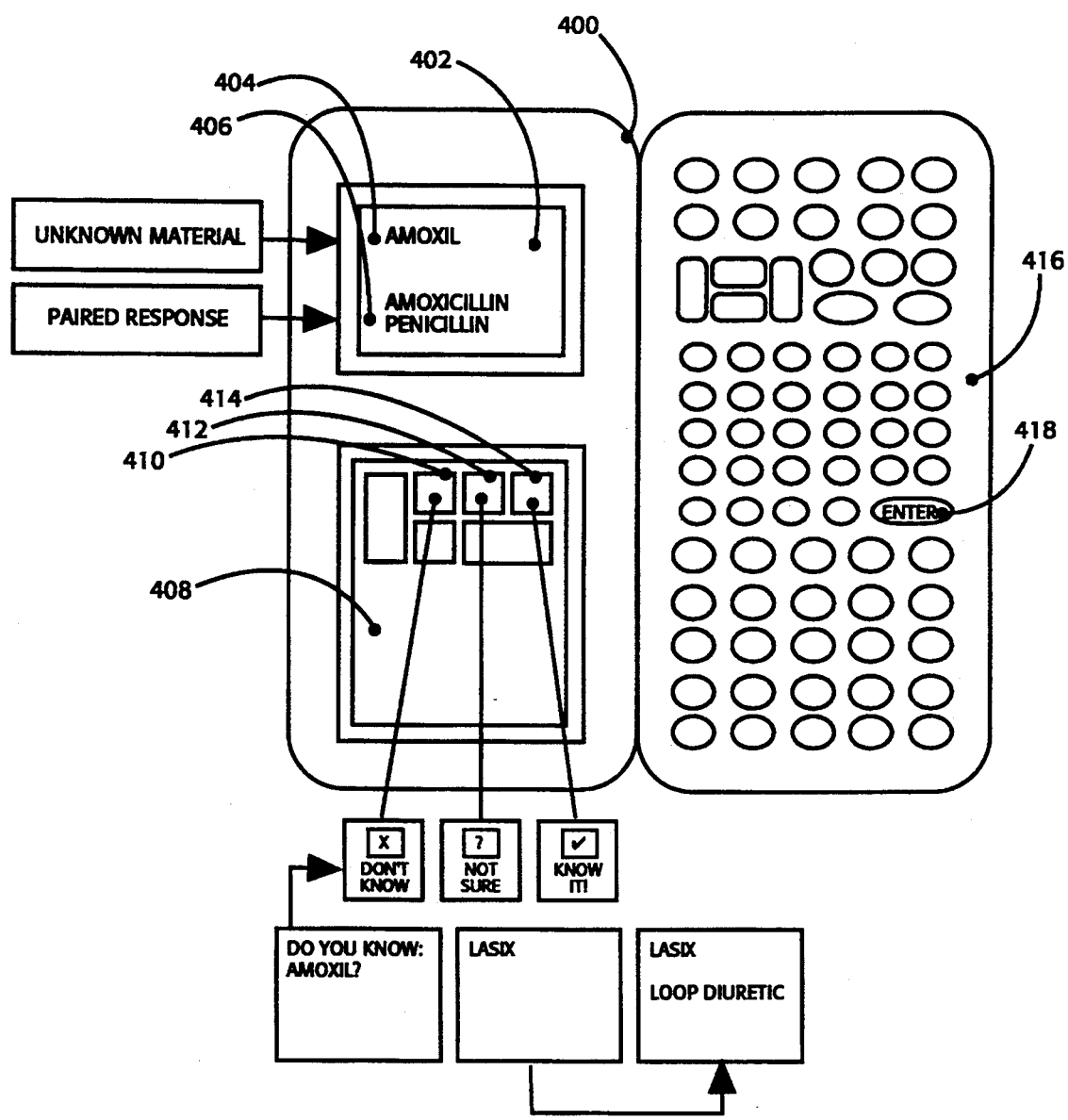
FIG. 7 illustrates a second embodiment of an apparatus of the present invention and for practicing the methods of the present invention.

Referring now to FIG. 7, an alternative embodiment of an apparatus in accordance with the present invention is shown generally as computer 400. Similar to the computer shown in FIG. 6, this computer employs a standard microprocessor with conventional internal arithmetic and logic functions, conventional I/O handling and off-chip memory in RAM, ROM or other suitable memory device. As these items are well-known to those persons of ordinary skill in the art, they are not shown. Referring now to computer 400, there is a display 402 which in the preferred embodiment is a liquid crystal display for presenting an item 404 and its associated paired response 406 to the user. In this case, the item 404 is material not known or believed to be not known by the user and referred to as unknown material. At input pad 408, various input devices are shown consisting of conventional pressure activated switches 410, 412 and 414 for receiving a user response. Switch 410 indicates that the user perceives he does not know the item. Switch 412 indicates that the user is not sure whether the item is known or unknown and switch 414 indicates that the user perceives he does know the item. Also shown is keyboard 416 consisting of a full set of alpha numeric keys as well as various control keys. Keyboard 416 permits for vastly increased user input. For instance, in one embodiment of the invention, the user is permitted at anytime to interrupt the learning process and activate a game or another learning module. For instance, by activating the enter key 418, the process of displaying the group of items would be halted and the user would be asked whether he wished to continue, start the sequence over, use a new sequence, play a game or some other activity.

In an alternative embodiment of computer 400, a method in accord with the present invention is contained on external memory. The external memory can be any of the type such as a floppy disk (both 5¼" and 3½" varieties) a card or other chip type memory such as RAM or ROM. In this embodiment, a device is provided for configuring computer 400 to perform either a method of teaching a user or evaluating user performance by presenting a group of items. The device has means for configuring input pad 408 to query the user as to whether an item is perceived known or unknown. The device has means for configuring the processor of computer 400 to sort each of the items into a group of perceived known items and a second group of perceived unknown items. The device also has means for configuring the processor of computer 400 to generate a sequence of subjective items including at least one of said first group and one of said second group. The device is provided with means for configuring display 402 with the sequence of the subjective items. The configurations described are preferably made by stored program instructions as is well-known to those of ordinary skill in the art.

The computers described in FIGS. 6 and 7 can operate under a set of stored instructions written in accord with the various embodiments of the method shown.

From the above description it will be seen by those having ordinary skill in the art that under the present invention, a method and apparatus is provided that focuses on the user's perceived knowledge of an item and does not require the user to actually know the item. In this way, improved automated learning and performance evaluation can be achieved. Since the invention may be incorporated into a microprocessor based stored program digital computer or a removable storage device, a wide variety of learning methods may be provided. While the invention has been particularly shown and described with reference to a preferred embodiment, it will be understood by those of ordinary skill in the art that various other changes in form and detail may be made without departing from the spirit or scope of the invention.

What is claimed is:

1. A method for teaching to a user a group of items where each of said items has a paired response, said method comprising:
   querying said user as to whether an item is perceived known or unknown;
   sorting each of said items into a first group of perceived known items and a second group of perceived unknown items;
   generating a sequence of subjective items including at least one of said first group and one of said second group; and
   displaying said sequence of subjective items with said respective paired response.

2. The method of claim 1, wherein said sequence of items and paired responses are displayed differently depending on whether said item is taken from said first group or said second group.

3. The method of claim 2, wherein items of said first group are displayed separately from said paired responses.

4. The method of claim 2, wherein items of said second group are displayed together with said paired responses.

5. The method of claim 1, further comprising the step of determining whether the user wishes to continue.

6. The method of claim 1, wherein said querying step also queries said user as to whether said user is not sure of said item being known or unknown.

7. The method of claim 6, wherein said second group includes items where said user is not sure of said item being known or unknown.

8. An apparatus for evaluating performance of a user comprising:
   memory means for storing a file of items;
   display means for presenting each item to said user;
   input means for receiving a response from said user for each item as to whether the item is perceived known or unknown; and
   processor means, responsive to said user's response, for sorting said items into groups of subjectively known items and subjectively unknown items and for generating a sequence of one subjectively unknown item and a plurality of subjectively known items.

9. The apparatus of claim 8, wherein said display means is an visual display.

10. The apparatus of claim 8, wherein said display means is an audio display.

11. The apparatus of claim 8, wherein said input means further comprises three switch means indicating whether said user knows the item is known or unknown.

12. A device for configuring a digital computer to perform a method of teaching a user or evaluating user performance by presenting a group of items where said computer has an input means, a processor and a display, said device comprising:
   means for configuring said input means to query said user as to whether an item is perceived known or unknown;
   means for configuring said processor to sort each of said items into a group of perceived known items and a second group of perceived unknown items and to generate a sequence of subjective items including at least one of said first group and one of said second group; and
   means for configuring said display to present said sequence of subjective items.

13. The device of claim 12, wherein said device is packaged as a memory card.

14. The device of claim 12, wherein said device is packaged as a floppy disk.

15. The device of claim 12, wherein said device is packaged as a read-only memory.

16. The device of claim 12, wherein said device is an optical memory.

17. The device of claim 12, wherein said device is an integrated circuit.

* * * * *